United States Patent
Kobori et al.

(10) Patent No.: US 9,256,060 B2
(45) Date of Patent: Feb. 9, 2016

(54) PINHOLE ARRAY AND DISPLAY DEVICE USING SAME

(71) Applicant: HITACHI MAXELL, LTD., Osaka (JP)

(72) Inventors: Tomoki Kobori, Tokyo (JP); Yoshiho Seo, Tokyo (JP); Koji Hirata, Ibaraki (JP); Hidehiro Ikeda, Ibaraki (JP); Satoshi Ouchi, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/406,139

(22) PCT Filed: Feb. 22, 2013

(86) PCT No.: PCT/JP2013/054436
§ 371 (c)(1),
(2) Date: Dec. 5, 2014

(87) PCT Pub. No.: WO2014/002526
PCT Pub. Date: Jan. 3, 2014

(65) Prior Publication Data
US 2015/0153551 A1  Jun. 4, 2015

(30) Foreign Application Priority Data
Jun. 27, 2012 (JP) .................................. 2012-143689

(51) Int. Cl.
*G02B 5/126* (2006.01)
*G02B 17/00* (2006.01)
(Continued)

(52) U.S. Cl.
CPC ............ *G02B 17/002* (2013.01); *G02B 17/008* (2013.01); *G02B 17/061* (2013.01); *G02B 17/0808* (2013.01); *G02B 27/2292* (2013.01)

(58) Field of Classification Search
CPC ...... G02B 17/00; G02B 17/002; G02B 17/06; G02B 17/008; G02B 17/061; G02B 17/0808; G02B 27/22; G02B 27/2292
USPC .................... 359/534, 732, 839, 859; 345/158
See application file for complete search history.

(56) References Cited

U.S. PATENT DOCUMENTS 5,841,596 A * 11/1998 Perlo ..................... G02B 5/1876
359/839
2005/0226319 A1  10/2005 Harada et al.
(Continued)

FOREIGN PATENT DOCUMENTS

JP  2005-303966 A1  10/2005
JP  2009-053263 A   3/2009
(Continued)

*Primary Examiner* — Euncha Cherry
(74) *Attorney, Agent, or Firm* — Mattingly & Malur, PC

(57) ABSTRACT

Two pieces of elliptic semi-sphere surfaces, each forming a pinhole at the zenith thereof and also forming a reflection mirror on an inside thereof are stuck onto each other, with facing the interior surfaces thereof, respectively. A light ray entering therein from one of the pinholes, after being reflected between the elliptic semi-sphere surfaces facing to each other, emits from the pinhole on opposite side at an angle plane symmetric to the incident angle. Disposing the elliptic semi-sphere surfaces facing to each other, aligning on a plane, by plural numbers thereof, there is built up a pinhole array. Plural numbers of light rays reflecting on and/or emitting from a display object, which is disposed on one side of the pinhole array, after passing through the plural numbers of pinholes of the pinhole array, form an image at a position plane symmetric thereto, on the opposite side of the pinhole array.

10 Claims, 9 Drawing Sheets

(51) Int. Cl.
*G02B 17/06* (2006.01)
*G02B 17/08* (2006.01)
*G02B 27/22* (2006.01)

(56) References Cited

U.S. PATENT DOCUMENTS

2010/0066662 A1 3/2010 Tomisawa et al.
2011/0026266 A1 2/2011 Sasaki et al.
2012/0092766 A1 4/2012 Maekawa et al.

FOREIGN PATENT DOCUMENTS

| JP | 2010-262228 A | 11/2010 |
| WO | 2008/041314 A1 | 4/2008 |
| WO | 2009/131125 A1 | 10/2009 |

* cited by examiner

PINHOLE ARRAY AND DISPLAY DEVICE USING SAME

TECHNICAL FIELD

The present invention relates to an optical element and a display device using the same, for achieving such a video display that an observer can view or recognize a 3D image(s) thereon.

BACKGROUND OF THE INVENTION

Conventionally, studies have been made on the technology relating to such the display device for the observer to make a sense that a video or picture is displayed in a space.

For example, in the following Patent Document 1 is disclosed a technology for forming an actual image (i.e., the video), easily, by guiding light rays information of a target laying on an opposite side to the observer through orthogonal flat reflectors, within a space defined between the observer and the orthogonal flat reflectors.

Also, in the following Patent Document 2 is disclosed a technology for enabling a freely settable viewpoint to observe the actual image (i.e., the video) by means of a mirror, with forming that actual image (i.e., the video) at a position being symmetric thereto, by transmitting the light while refracting it therein with using an optical system, in which orthogonal two mirror surface elements are formed on a plane by a plural number thereof, and also the mirror therein.

PRIOR ART DOCUMENTS

Patent Documents

[Patent Document 1] International Patent Application Publication No. 2009/131125; and
[Patent Document 2] Japanese Patent Laying-Open No. 2010-262228.

BRIEF SUMMARY OF THE INVENTION

Problem(s) to be Dissolved by the Invention

Within such display device that the observer can recognize the 3D images thereon, it is preferable for her/him to sense the video with high resolution, depending on an observing direction thereof, even if she/he observes it from any direction.

However, with such technology disclose in the Patent Document 1 mentioned above, there is a possibility that ill influences are given on the quality of the forming actual image (i.e., the video), in particular, if the reflecting conditions of the light beams are not uniform, when guiding the light beam information of the target, and therefore, for the observer to sense a floating image at high definition, it is needed to increase an accuracy to be high of the plat reflectors. On the other hand, with such technology disclose in the Patent Document 2 mentioned above, a region or area, within which the observer can sense the floating image, is limited.

The present invention, being achieved by taking the problems of the above-mentioned conventional technologies into the consideration thereof, accordingly, an object thereof is to provide a technology for enabling an observation, as if the video is floating within the space, without causing a consciousness of existence of a reflector or a diffuser, such as, a screen, etc., for example, when the observer senses the video within the space, and also by widening the region (i.e., a viewing area) for enabling the observer to sense the video within the space even if she/he observes it from any direction.

Means for Dissolving the Problem(s)

According to the present invention, for accomplishing the object mentioned above, there is provided a pinhole array comprising: plural numbers of entrance pinholes, each of which is configured to capture a light ray therein; plural numbers of exit pinholes, each of which is configured to emit the light ray therefrom; and plural numbers of pinhole reflectors, in each of which a pair of an entrance pinhole and an exit pinhole are formed to face to each other, and each of which is configured to emit the light ray entering therein from said entrance pinhole, after reflecting at least two (2) times therein, wherein an image is formed by the light rays emitting from said plural numbers of exit pinholes.

Also, according to the present invention, in the pinhole array, as described in the above, said each pinhole reflector has elliptic semi-sphere recessed reflection surfaces, facing to each other therein, and the pinhole is provided at a zenith portion of said elliptic semi-sphere surface.

Effect(s) of the Invention

According to the present invention, since there is no necessity of being aware of the existence of a reflecting object and/or a diffusing object, such as, a screen, etc., when sensing the video floating in the air, and also, since it is possible to obtain a preferable contrast and/or resolution (video density), and further to widen a region, on which the floating video can be sensed from any direction; therefore, it is possible to achieve an improvement of performance of the 3D video.

EMBODIMENTS FOR CARRYING OUT THE INVENTION

Figure 1:
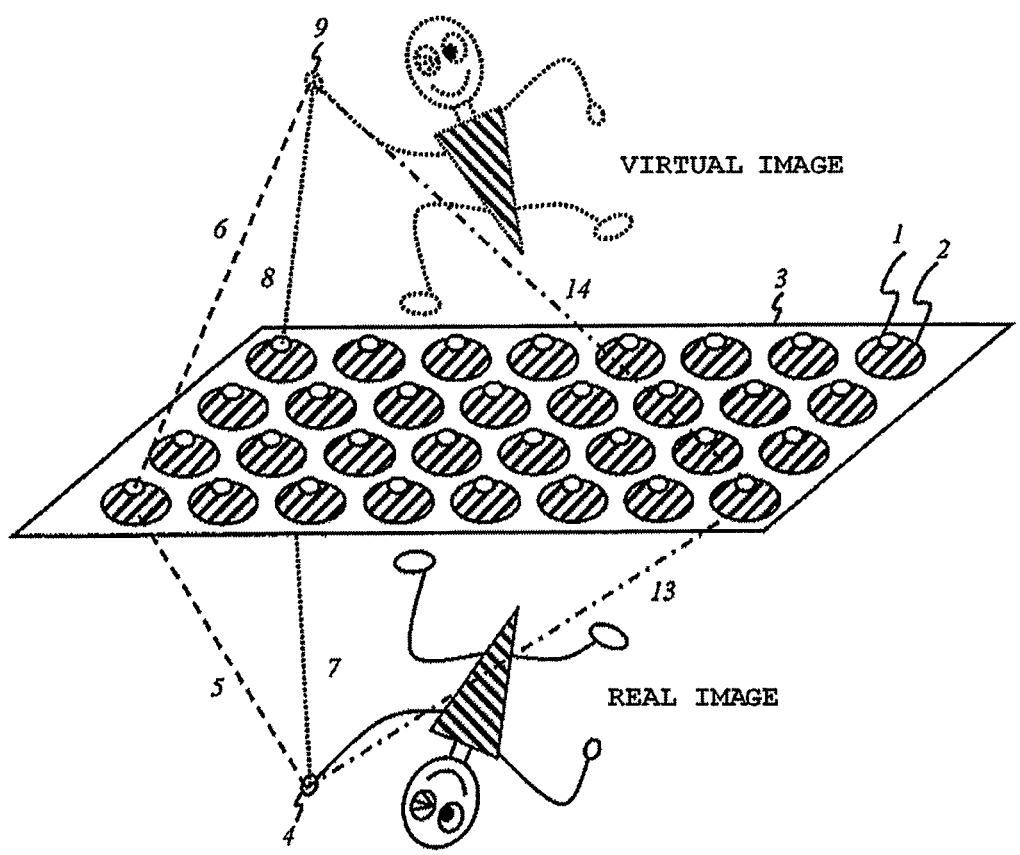
FIG. 1 is a structure view for showing a pinhole array and a display device applying the same therein, according to an embodiment of the present invention.

Hereinafter, explanation will be given on the embodiments of the present invention by referring to the drawings attached herewith. However, in each of those drawings or in each of those embodiments, the same reference numeral will be given to an element having the same structure, function or effect, for eliminating the duplicate explanation thereof.

FIGS. 1-8, for explaining the pinhole array and the display device applying the same therein, according to a first embodiment of the present invention, show therein the structure of the display device, which can display a plane (2D) and/or a cubic (3D) through a floating image displaying method.

Figure 2:
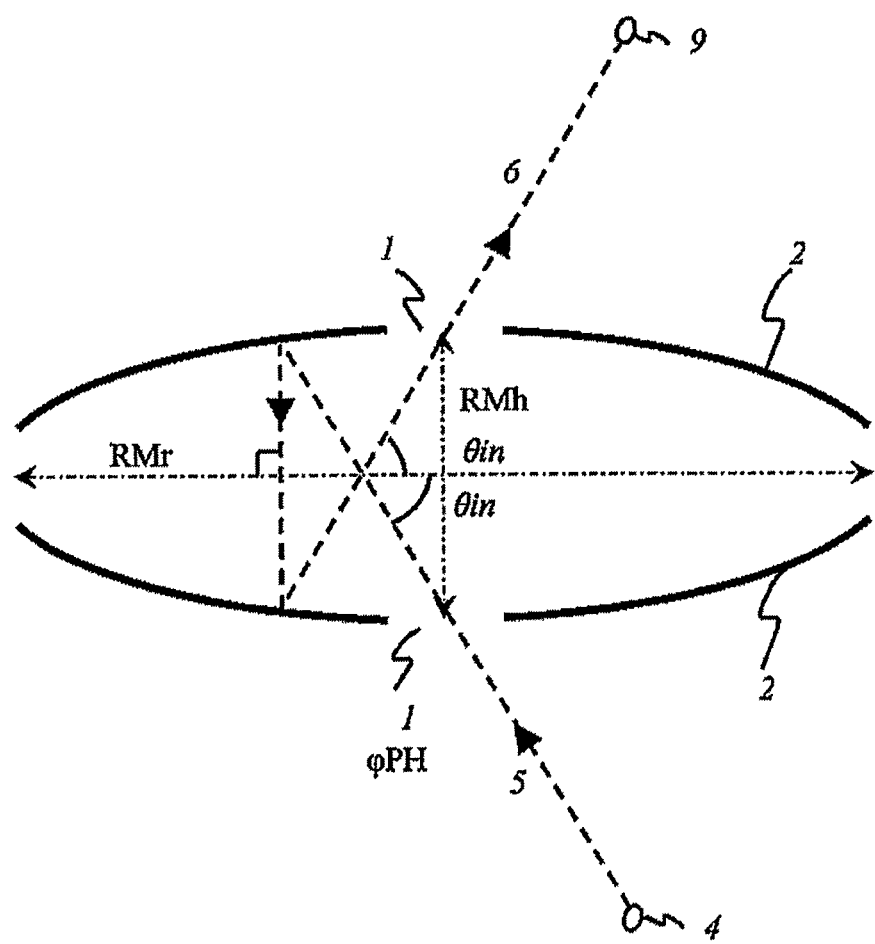
FIG. 2 is a structure view for supplementing a pinhole reflector, according to the embodiment of the present invention.

In FIGS. 1-8, a reference numeral depicts a pinhole, 2 a pinhole reflector, 3 a pinhole array, 4 a diffusion light source, 5, 6, 7, 8, 13 and 14 light rays, and 9 an image forming light source, 15 and 16 stray lights, respectively. However, for the purpose of explanation, a part of an actual image in FIG. 1 is presented by the diffusion light source 4, and by showing three (3) pieces of light rays therefrom. FIG. 2 shows a side surface (i.e., a cross-section view) of the pinhole reflector. In more details thereof, the pinhole reflector 2 has a cubic or three-dimensional (3D) structure for forming a circle in the direction of front and back of the paper surface, in the structure thereof.

(Explanation of Operation)

The pinhole array (i.e., an optical sheet) 3 of the present embodiment shown in FIG. 1 is constructed by arranging elliptic semi-sphere surface reflectors, each forming a pinhole of "$\phi ph$" at a top or zenith thereof, and further, forming a reflection mirror on an inner-side surface or an outer-side surface thereof, a pair of pinhole reflectors 2, being formed by facing two (2) pieces of said elliptic semi-sphere surface reflectors 2 to each other on the inner-side surfaces thereof, and the pinhole reflectors 2 by plural numbers of pieces thereof on a flat surface.

Explanation will be given on the structure of one pinhole reflector 2, by referring to FIG. 3. A reflecting configuration of the reflector 2 is determined in such a manner that, on the pair of pinhole reflectors 2, a light beam 5 entering at a desired angle "$\theta in$" from one of the pinholes (for example, a lower side of the paper surface of FIG. 2) can be reflected at least two (2) times, between the elliptic semi-sphere surface reflector 2 facing thereto, and it can exit at the angle "$\theta in$" plane symmetric to an incident angle (on basis of the facing surface of the elliptic semi-sphere), from the pinhole of the opposite side thereto (i.e., the upper side on the paper surface of the same figure).

However, each of the pair of pinhole reflectors 2, building up the pinhole array 3 is formed in such a manner that the surfaces of the elliptic semi-spheres thereof are positioned, nearly, on the same surface.

Next, explanation will be given on a manner for forming a real image on an opposite side to the pinhole array 3. Light rays 5, 7 and 13, reflecting on or emitting from an object or a substance to be displayed, which is disposed on one side of the pinhole array 3 (i.e., the lower side on the paper surface of FIG. 1), as a diffusing light, form an image 9 at the position, being plane symmetric to the pinhole array 3.

In more details, as was mentioned above, the light ray 5 enters into the pinhole array 3 from one pinhole thereof, and after being reflected twice (by two (2) times) within the pinhole array 3, it emits or exits from a pinhole opposite to that on the entrance side, at an angle same to the incident angle thereof. In the similar manner, the light rays 7 and 13 enter into the one side of the pinhole of the different pinhole reflector, and exit from the pinhole opposite thereto. In this instance, the incident angle of the light rays 5, 7 and 13 and the exit angle of the light rays 6, 8 and 14 are equal to, and then the image 9 is formed by the light rays 6, 8 and 14.

Next, explanation will be given on the shape of the pinhole. A diameter "$\phi ph$" of the pinhole is sufficient enough, in the size thereof, to pass or transmit the light rays having wave components of visual light therethrough, and should be determined so that a desired amount or volume of light rays can be taken or captured therein. Also, the size/shape of the semi-sphere (diameter=RMr, height=RMh/2), and also a curvature thereof should be determined in such a manner that the incident angle "$\theta in$" satisfies the desired one.

For example, in case where "$\phi ph$"=20 μm, "RMr"=100 μm and "RMh"=33 μm, the curvature should be determined in such a manner that an efficiency of taking the lights therein on the pinhole reflector 2 comes to around 4% from a ratio of area, and that the light can be taken or captured into up to the incident angle "$\theta in$"=45° at a central portion of the pinhole. In the similar manner, where "$\phi ph$"=40 μm, the efficiency of taking the lights therein is increased up to around 16%.

Figure 9:
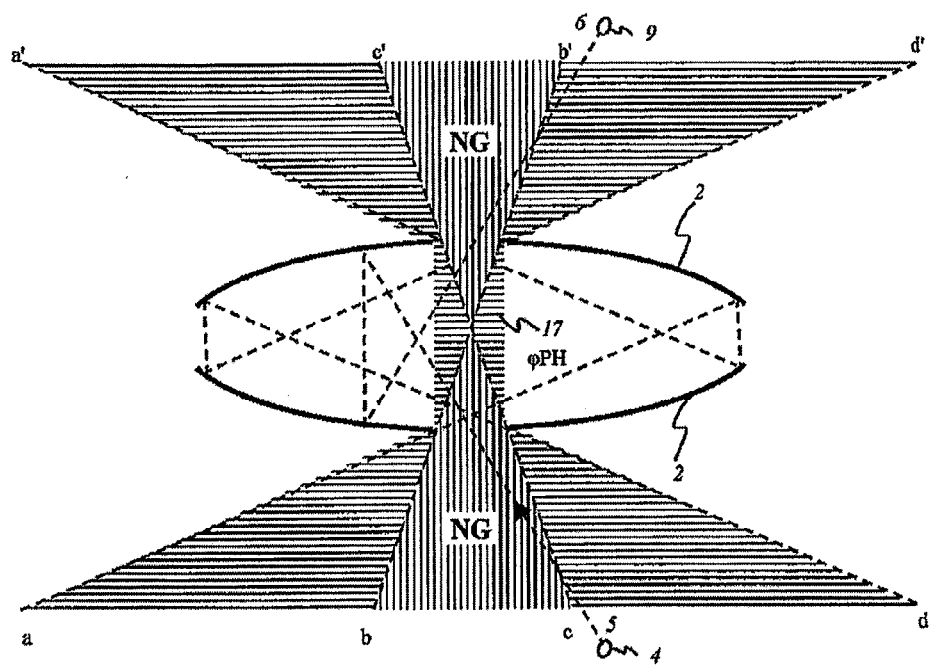
FIG. 9 is a structure view for explaining a pinhole array, according to an embodiment of the present invention.

However, the light rays, which pass through the pinhole, has the exit angle differing from the incident angle, and then they do not contribute to the image forming. As is shown in FIG. 9, if a non-reflecting area (i.e., the light components of "NG" area shown in FIG. 9), where the light rays pass through without hitting on the reflector 2, increases, since the light rays for forming an image come to be lessened, then it should be adjusted depending on the way of application thereof. Of course, the non-reflecting area may be reduced by figuring out the structure thereof, and this will be mentioned later, by referring to FIGS. 3, 4, 5, 6 and 10.

Also, the numerical values mentioned above should not be limited to those, but may be determined depending on the way of application thereof.

Hereinafter, one example will be shown as a forming method of the pinhole 1 and the semi-sphere surface 2.

(Manufacturing Method 1: Hollow)

First of all, explanation will be given on the case where the semi-sphere surface 2 is hollow in the inner-side thereof.

By a pressing machine, with which micromachining of an accuracy of nano-meter can be achieved, a transparent material, such as, glass or plastic, etc., is formed in such a manner that a plural number of pieces of recesses of the elliptic semi-sphere surface 2 are arranged on a plane surface, and thereby obtaining one side (i.e., the pinhole array sheet) of the pinhole array 3. Next thereto, reflection films are formed on the recess surfaces on the inner surface thereof, for reflecting the light rays with high efficiency thereon.

The hole having the diameter "$\phi ph$", being formed at the zenith of the elliptic semi-sphere surface 2, respectively, may be obtained by punching it out when conducting the press machining mentioned above, or it may be formed to transmit the light rays therethough, without forming a reflection film on a pinhole portion, when forming the reflection film mentioned above.

Figure 3:
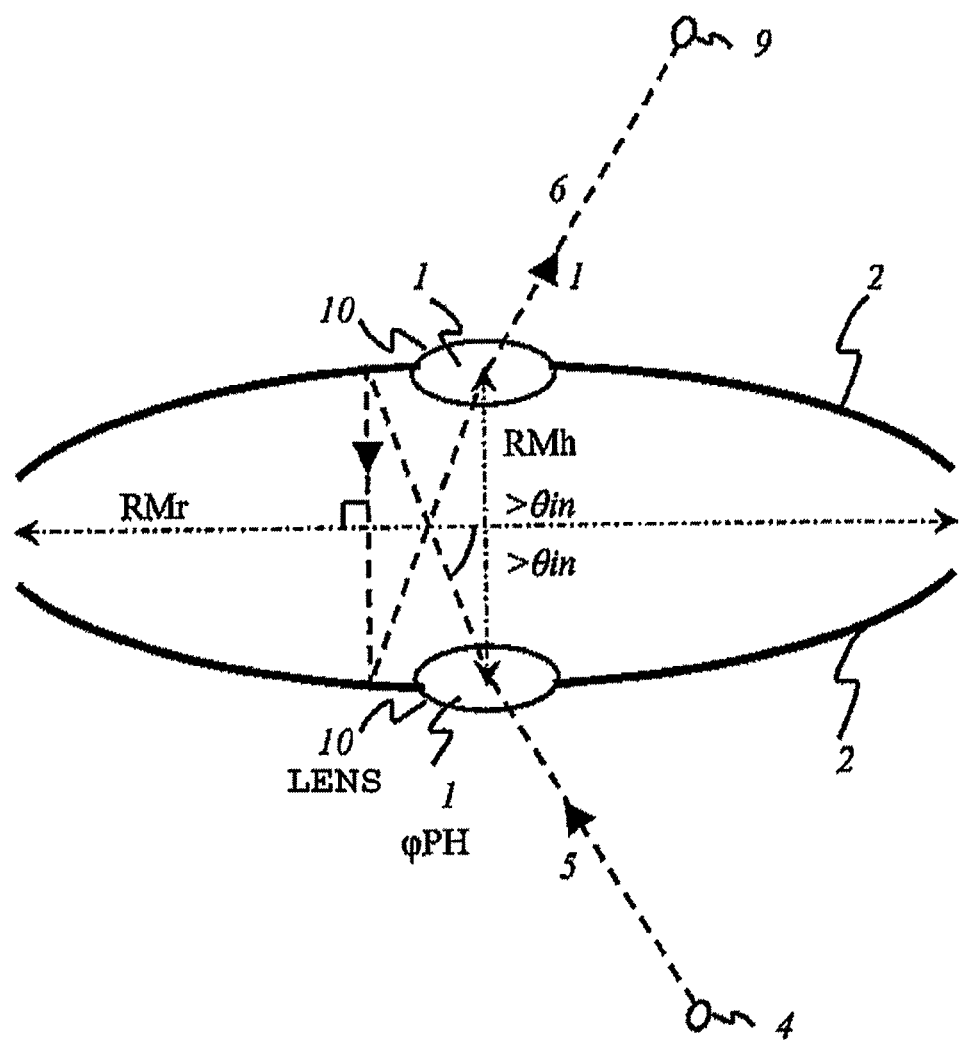
FIG. 3 is a structure view for supplementing a pinhole reflector, according to other embodiment of the present invention.
Figure 4:
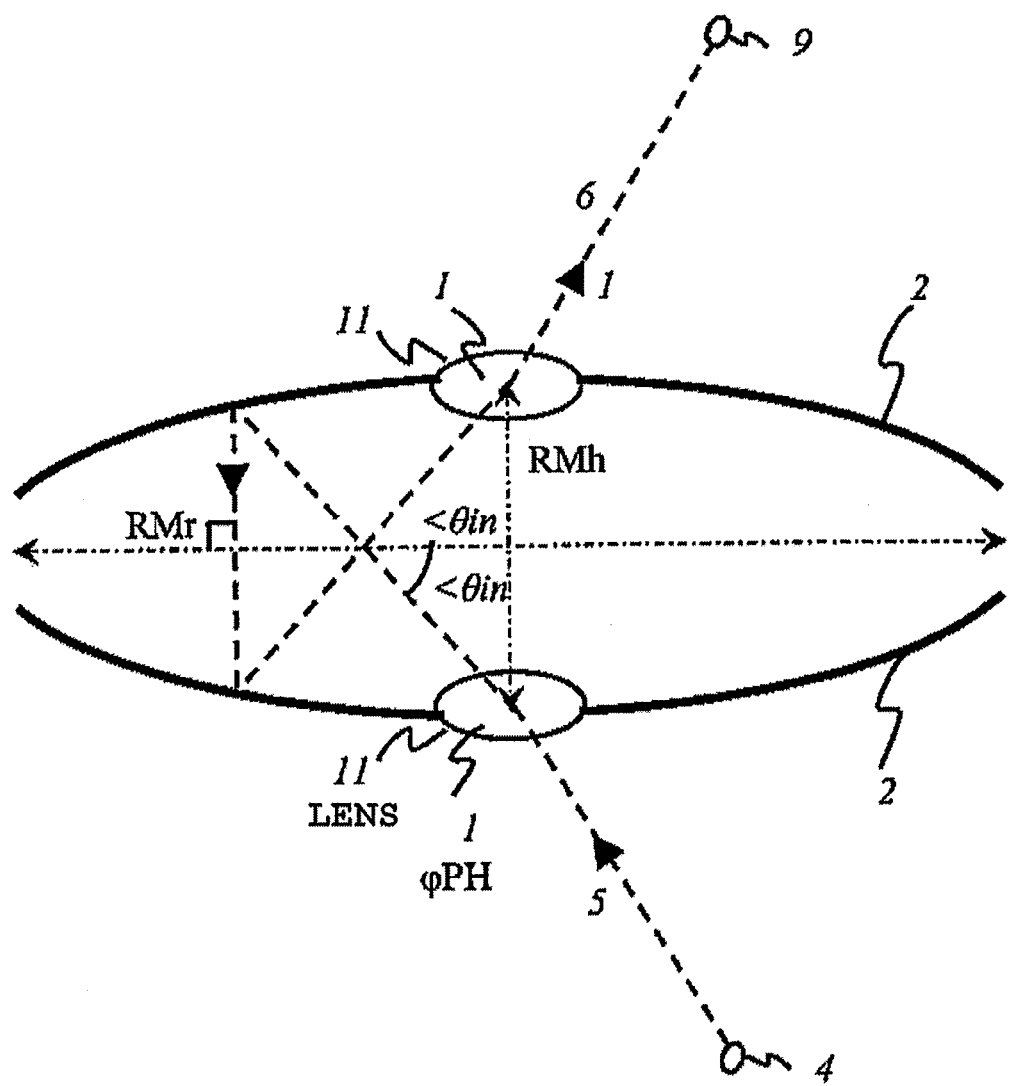
FIG. 4 is a structure view for supplementing a pinhole reflector, according to other embodiment of the present invention.
Figure 5:
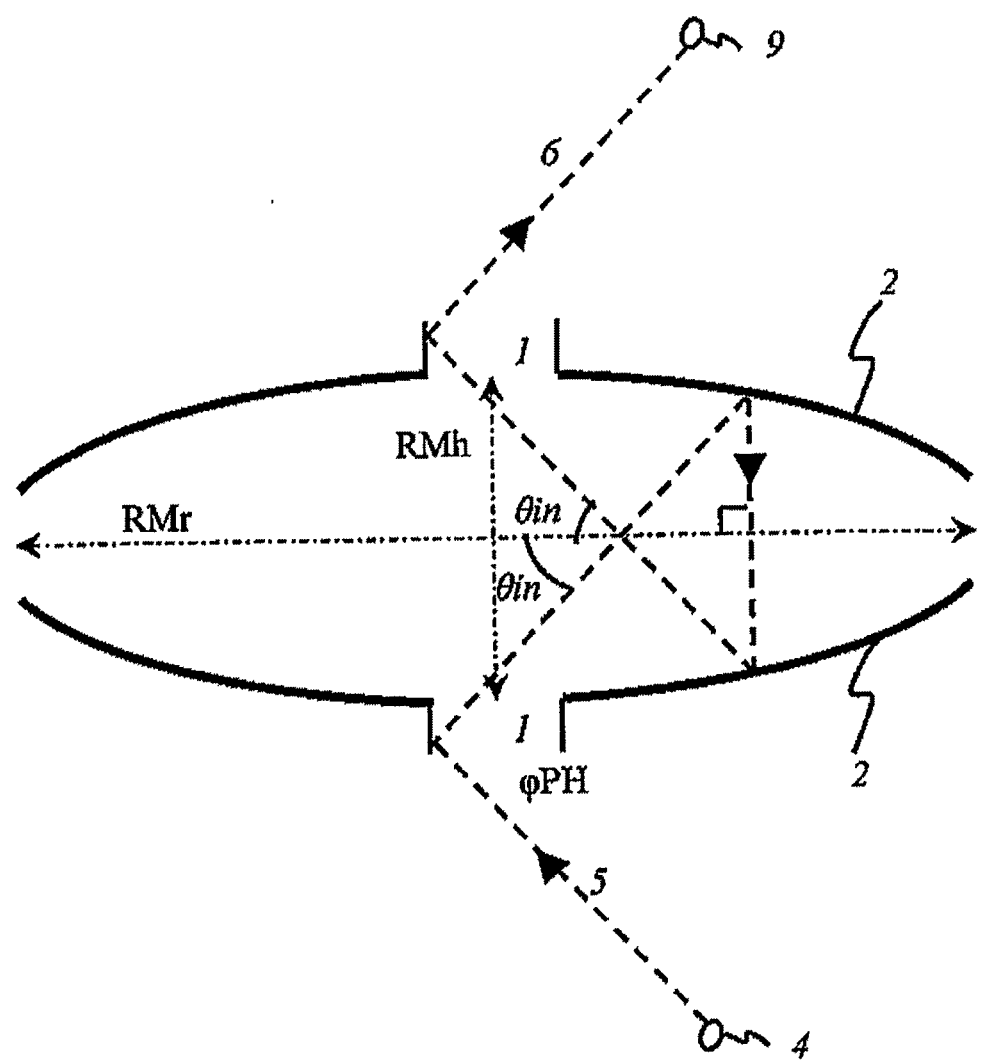
FIG. 5 is a structure view for supplementing a pinhole reflector, according to other embodiment of the present invention.

Further, as is shown in FIGS. 3, 4 and 5, it is also possible to increase/decrease an amount or volume of the light rays to be taken or captured therein, by adding lenses 10 and 11 and/or a reflecting plate to the pinhole.

However, the shape of the pinhole array is also unrestricted, but depending on the way of application and/or the manufacturing capacity thereof.

Those pinhole arrays 3 (i.e., the pinhole array sheets), which are formed in such manner as mentioned above, are stuck together, so that the recesses of the elliptic semi-sphere surfaces 2 are facing to each other, and that a gap between the pinholes comes to "RMr". This adjustment of the gap may be made by laying a spacer between those pinholes or by adjusting an amount of recess (an amount of depth) of the elliptic semi-sphere surface, when conducting the press machining).

Figure 8:
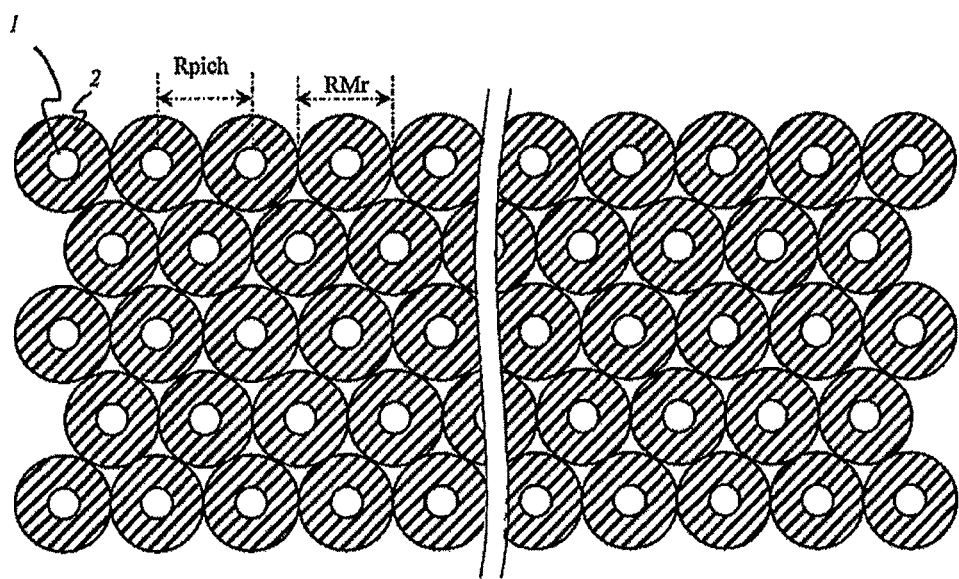
FIG. 8 is a structure view for explaining a pinhole array, according to an embodiment of the present invention.

As a method for arranging the elliptic semi-sphere surfaces 2 of the pinhole array 3, each having the diameter "RMr", a zigzag arrangement is preferable, aligning at a pitch "Rpich" ("Rpich"≥"RMr") as shown in FIG. 8, however it may any one of others, including an arrangement by aligning them into the vertical and the horizontal directions, and an arrangement of a honeycomb-like manner by forming the peripheral portions thereof into a hexagon, etc., for example.

For the purpose of bringing the lights transmitting through the pinhole reflector 2 to form an image, it is preferable that the number of the pinholes is large per a unit of an area of the pinhole array 3, from a sense of the amount of the lights; however, with this, since the incident angle comes to be narrow, then selection is made, appropriately, on the size and the arrangement of the pinhole, depending on the real image of the target.

(Manufacturing Method 2: One Body)

Next, there is shown the case where the inner side of the elliptic semi-sphere surface 2 is filled up with a transparent material.

The pressing machine and the forming of the reflection film, etc., are same to those mentioned above. The pinhole arrays, each forming a convex of the elliptic semi-sphere surface 2 on one surface thereof, are stuck to each other, or they are formed into one body so that both surfaces thereof are convex. In case of forming the one body, since the forming is made by taking an optical axis and the gap between the sheets into the consideration thereof, there is no necessity of adjustment. In the processing of the pinhole 1, it is formed, but without cutting out or forming the reflection film, conducting no punching process when conducting the press processing. This is also same to cases where the lenses 10, 11 or the reflection film are added to the pinhole, as is shown in FIGS. 3, 4 and 5.

When sticking the pinhole arrays 3 (i.e., the pinhole array sheets), on each of which the plural number of pieces of the pinhole reflectors formed in such manner as mentioned above, the opposite surface, onto which the pinhole array 3 (i.e., the pinhole array sheets) is stuck or piled, may be hollow, as an end-surface processing when facing the elliptic semi-sphere surfaces 2 of the pinhole reflectors 2. Or, alternatively, a light ray absorbing material may be coated on the hollow surface mentioned above, so as to reduce the stray lights.

(Capture and Emission of Light Rays)

Explanation will be given on the embodiments having the different structure in the condition of transmitting the lights on the pinhole reflector, by referring to FIGS. 2, 3, 4, 5, 6 and 10.

In FIG. 2, the curvature of the reflection surface of the pinhole reflector 2 is so determined, that the light rays, entering obliquely, so as to pass through a center of the pinhole 1, is always reflected at the right angle (90 degree) on the pinhole reflector 2 facing thereto, even if it hits on any one of the surfaces on the reflector. The light rays starting from the diffusion light source 4, after passing through the pinhole 1 at the incident angle "θin" and reflecting on the pinhole reflector 2, is reflected on the pinhole reflector 2 facing thereto, and it exits from the pinhole 1 at the exit angle "θin" as the light ray 6.

FIG. 9 is a view for showing the ranges of the entering light rays and the exiting light rays on the pinhole 1 by areas thereof. The light rays entering from the area between "b" and "c" (an area hatched by vertical lines) exit from the pinhole, directly, not passing through the pinhole reflector 2. For this reason, they do not contribute to the image forming, and define a dead zone. In the similar manner, the area defined on the left-hand side than "a" and on the left-hand side than "d" is also the dead zone. The light rays entering from the areas defines between "a" and "b" and "c" and "d" (an area hatched by horizontal lines), after being reflected twice (2 times) on the pinhole reflector 2, exit from the pinhole; i.e., the area of the light rays for collecting or forming an image together with the light rays exiting from other pinhole.

As was mentioned above, with the pinhole array 3 according to the present embodiment shown in FIG. 2, there are produced the dead zones. Judging from a viewpoint of an image forming capacity thereof, it is preferable that the dead zone (s) is/are less in the number and/or the area thereof. Hereinafter, explanation will be given on a method for lessen the dead zone (s) by increasing/decreasing an amount and an angle of the light rays to be taken or captured therein, and a method for reducing a non-reflection area.

FIG. 3 is the structure view of the cross-section of the pinhole reflectors 2, on each of which the lens 10 is provided at the pinhole 1 thereof. The lens 10 is a dioptric lens, and has characteristics of bringing the incident angle "θin" to increase >"θin" (a reduction lens). On the exit side, similar to the incident side, the light rays are refracted, and the exit angle is increased. With this, the areas defined between "a" and "b" and between "c" and "d" are shifted outside to the left and the right; thereby achieving an enlargement of the areas.

FIG. 4 is the structure view of the cross-section of the pinhole reflectors 2, on each of which the lens 11 is provided at the pinhole 1 thereof. The lens 10 is a dioptric lens, and has characteristics of bringing the incident angle "θin" to reduce <"θin" (a magnification lens). On the exit side, similar to the incident side, the light rays are refracted, and the exit angle is reduced. With this, the areas defined between "a" and "b" and between "c" and "d" are shifted inside to the left and the right; thereby achieving an enlargement of the areas.

FIG. 5 is the structure view of the cross-section of the pinhole reflectors 2, adding shielding walls of desired height, each having a reflection surface on an interior surface thereof, on the peripheries of an entrance opening and an exit opening of the pinhole 1. For example, they are set to have the height for excluding the light rays entering at the angle "θin" greater than 45 degrees into a center of the pinholes 1. As is shown in FIG. 5, the light ray 5 starting from the diffusion light source 4, being reflected on the shielding wall, enters into an inside of the pinhole reflectors 2, and after being reflected within the inside of the pinhole reflectors 2, it exits from the pinhole 1 upon reflection on the shielding wall of the exit opening. The exit light ray 5 forms an image together with the exit light from the other pinhole. With this, although the areas defined between "a" and "b" and between "c" and "d" are reduced, but an enlargement of an angle for taking in the light rays can be achieved.

Figure 6:
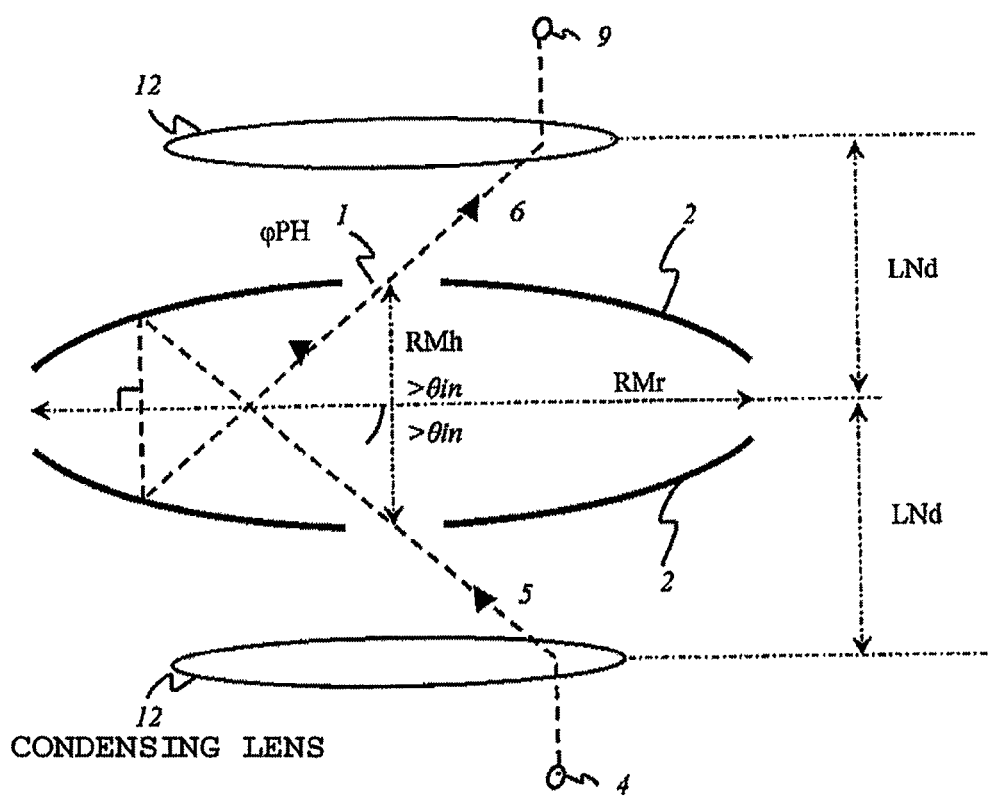
FIG. 6 is a structure view for supplementing a pinhole reflector, according to other embodiment of the present invention.

FIG. 6 is the structure view of the cross-section of the pinhole reflectors 2, being provided with lenses 12 on outsides of the entrance opening and the exit opening of the pinholes 1 thereof. The lens is provided in such a manner that the center of the pinhole 1 is located at the lens focus position thereof. With this, enlargement of the areas defined between "a" and "b" and between "c" and "d" can be achieved.

Figure 7:
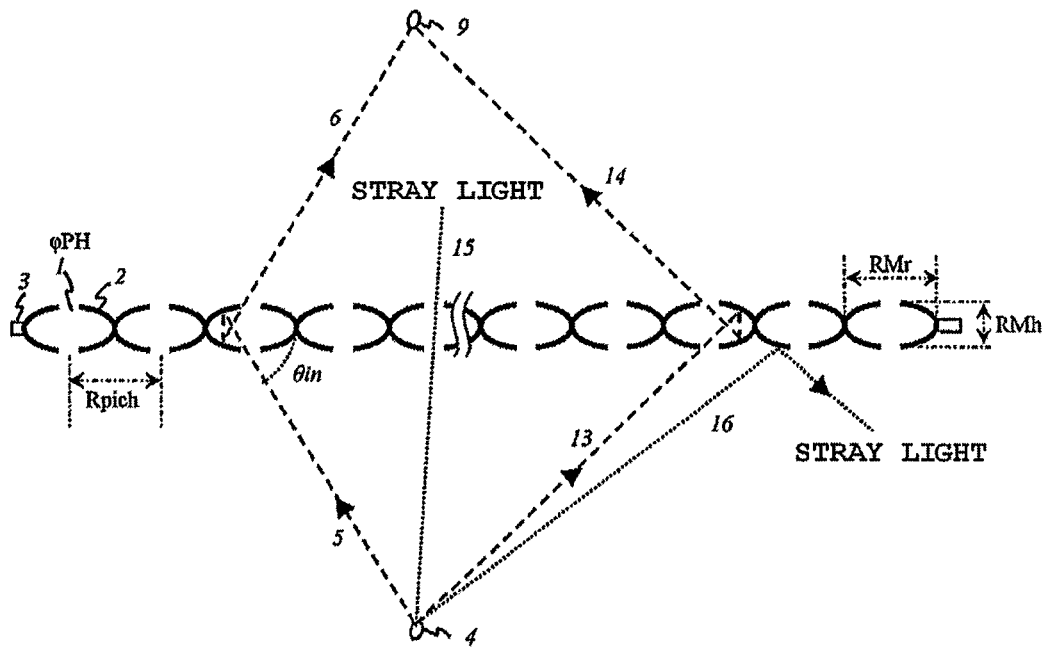
FIG. 7 is a structure view for explaining a pinhole array, according to an embodiment of the present invention.

FIG. 7 is a view for showing the positional relationships of the pinhole arrays 3, the diffusion light source 4 and the image forming light source 9 of the present embodiment. The light rays 5 and 13 among the light rays emitting from the diffusion light source 4 enter into the pinhole 1, as was explained previously, and generate the image forming light source 9. The light ray 16 emitting from the diffusion light source 4 does not enter into the pinhole 1, and it comes to be a stray light component, not contributing to the image forming. Also, as was shown in FIG. 9, the light ray 15, passing through, directly, from the pinhole, also does not contribute to the image forming.

Figure 10:
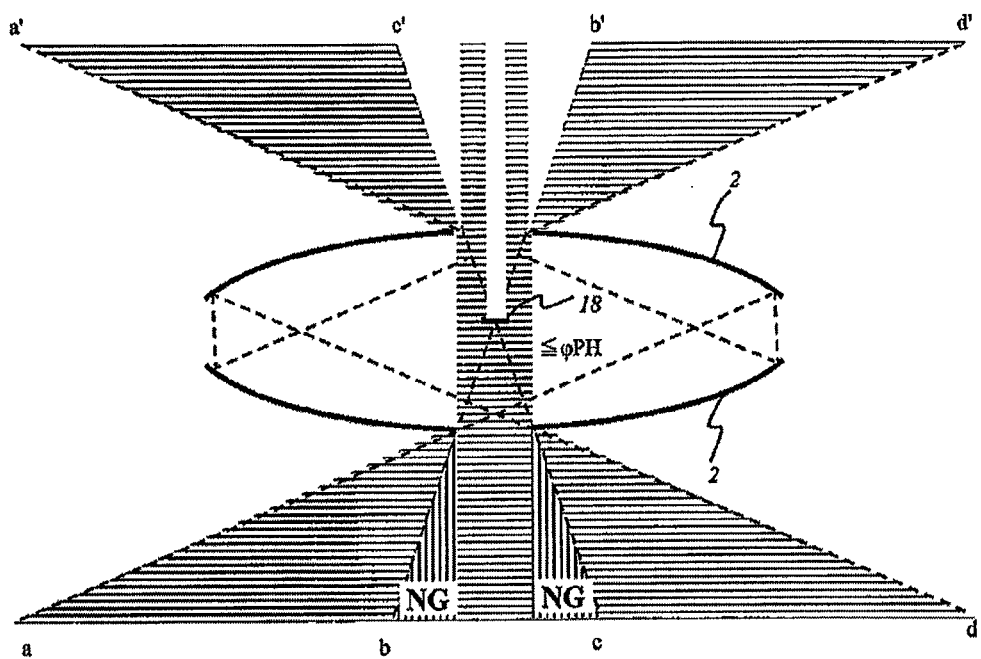
FIG. 10 is a structure view for explaining a pinhole array, according to an embodiment of the present invention.

FIG. 10 is for showing the structure of the pinhole reflectors 2 for excluding the light ray 15, passing through in FIG. 9, to an outside of the pinhole. In more details thereof, a light shielding plate 18, having a size equal to or less than the diameter "φph" of the pinhole 1, is provided at a central portion of the surface facing to the pinhole reflectors 2. With this, a part of the dead zone defined between "b" and "c" can be excluded, and it is possible to reduce the stray lights.

With applying the pinhole array 3 mentioned above, and also the light rays (i.e., the diffusion lights) emitting from the display device, for reproducing the light rays as the diffusion lights, for example, a liquid crystal display (LCD), or the light rays (i.e., the diffusion lights) emitting from a 2D plane of an image formed on a screen by a projector, it is possible to display a video, such as, a still picture or a moving picture.

Also, With applying the pinhole array 3 mentioned above, when reproducing the light rays (i.e., the diffusion lights) emitting from the display device, for reproducing the light rays as the diffusion lights, for example, the liquid crystal display (LCD), or a cubic (3D) light ray through image forming on the screen by the projector, it is possible to display a 3D video, such as, the still picture or the moving picture. Of course, it may be a 3D video obtained by applying the time-sequential left and the right video displays and a shatter glasses operating in synchronism with.

EXPLANATION OF MARKS

1 . . . pinhole, 2 . . . pinhole reflector, 3 . . . pinhole array, 4 . . . diffusion light source, 5, 6, 7, 8, 13, 14, 15, 16 and 17 . . . light ray, 9 . . . image forming light source, 10, 11, and 12 . . . lens, 18 . . . light shielding plate

What is claimed is:

1. A pinhole array, comprising:
    plural numbers of entrance pinholes, each of which is configured to capture a light ray therein;
    plural numbers of exit pinholes, each of which is configured to emit the light ray therefrom; and
    plural numbers of pinhole reflectors, in each of which a pair of an entrance pinhole and an exit pinhole are formed to face to each other, and each of which is configured to emit the light ray entering therein from said entrance pinhole, after reflecting at least two (2) times therein, wherein
    an image is formed by the light rays emitting from said plural numbers of exit pinholes.

2. The pinhole array, as described in the claim 1, wherein said each pinhole reflector has elliptic semi-sphere recessed reflection surfaces, facing to each other therein, and the pinhole is provided at a zenith portion of said elliptic semi-sphere surface.

3. The pinhole array as described in the claim 2, wherein facing surfaces of said plural numbers of pinhole reflectors are formed to be nearly on a same surface.

4. The pinhole array, as described in the claim 1, wherein said pinhole reflectors are so formed that the light ray entering therein at a desired angle "θin" from one of the pinholes, after being reflected at least two (2) times between the elliptic semi-sphere surfaces facing to each other, can emit at an angle "θin" plane symmetric to an incident angle from the pinhole on an opposite side thereof.

5. The pinhole array, as described in claim 1, wherein said pinhole reflector means is hollow in an inside of the elliptic semi-sphere surfaces, and has reflecting films on the interior surface thereof, and further a hole is formed at a zenith portion of the elliptic semi-sphere surface, or the reflecting film is removed therefrom, so as to allow a light to transmit therethrough.

6. The pinhole array, as described in claim 1, wherein said pinhole reflector means is formed from a material for transmitting a light sufficiently through the semi-sphere surfaces thereof, and an outside thereof is covered by a reflection film, and further a hole is formed at a zenith portion of the elliptic semi-sphere surface, or the reflecting film is removed therefrom, so as to allow a light to transmit therethrough.

7. The pinhole array, as described in claim 1, wherein a refractor lens is added to the pinhole of said pinhole array, thereby to increase/decrease an amount and an angle of the light to be captured therein.

8. The pinhole array, as described in claim 1, wherein a shielding wall of predetermined height, having a reflecting surface inside thereof, on periphery of the pinhole of said pinhole array.

9. The pinhole array, as described in claim 1, wherein a light shielding means, being equal to or less than diameter of the pinhole is provided at a center of the pinhole reflector means for building up said pinhole array.

10. A display device, for collecting the light rays, reflecting on or emitting from an object or a display body, which is disposed on the pinhole array, as described in claim 1, at a position plane symmetric to said pinhole array means forming thereby forming an image.

* * * * *